United States Patent
Bender et al.

(10) Patent No.: US 11,134,092 B2
(45) Date of Patent: Sep. 28, 2021

(54) SECURITY FOR INTERNET OF THINGS DEVICES

(71) Applicant: International Business Machines Corporation, Armonk, NY (US)

(72) Inventors: Michael Bender, Rye Brook, NY (US); Rhonda L. Childress, Austin, TX (US); Marc A. Dickenson, Austin, TX (US); Timothy J. Hahn, Cary, NC (US); David B. Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 15/486,018

(22) Filed: Apr. 12, 2017

(65) Prior Publication Data
US 2018/0302424 A1    Oct. 18, 2018

(51) Int. Cl.
| H04L 29/06 | (2006.01) |
| H04L 29/08 | (2006.01) |
| G06F 21/55 | (2013.01) |
| H04W 4/70 | (2018.01) |
| G06F 21/57 | (2013.01) |

(52) U.S. Cl.
CPC ........ H04L 63/1425 (2013.01); G06F 21/552 (2013.01); G06F 21/57 (2013.01); H04L 63/1441 (2013.01); H04L 63/20 (2013.01); H04L 67/10 (2013.01); H04L 67/24 (2013.01); H04L 67/303 (2013.01); H04W 4/70 (2018.02); G06F 2221/034 (2013.01); H04L 67/12 (2013.01)

(58) Field of Classification Search
None
See application file for complete search history.

(56) References Cited

U.S. PATENT DOCUMENTS

| 7,558,762 B2 | 7/2009 | Owechko et al. |
| 7,599,894 B2 | 10/2009 | Owechko et al. |
| 9,436,917 B2 | 9/2016 | Mermoud et al. |
| 2003/0142851 A1 | 7/2003 | Brueckner et al. |
| 2016/0087933 A1 | 3/2016 | Johnson et al. |
| 2016/0321125 A1* | 11/2016 | Kang .................. G06F 11/0706 |

(Continued)

OTHER PUBLICATIONS

Wente Zeng, et al., Resilient Distributed Control in the Presence of Misbehaving Agents in Network Control Systems, 2014, IEEE Transaction on Cybernetics, vol. 44, No. 11, 2038-2049 (Year: 2014).*

(Continued)

*Primary Examiner* — Luu T Pham
*Assistant Examiner* — Edward X Long
(74) *Attorney, Agent, or Firm* — Teddi E. Maranzano (57) ABSTRACT

Methods and apparatus, including computer program products, implementing and using techniques for enhancing the security of Internet of Things (IoT) devices. A homogenous and leaderless group of IoT devices sharing one or more common features is defined. During operation of the IoT devices, it is identified whether an IoT device in the group operates outside an expected tolerance for the operation of the IoT devices in the group. In response to identifying that an IoT device in the group operates outside an expected tolerance, an action is performed on the IoT device.

7 Claims, 4 Drawing Sheets

(56) References Cited

U.S. PATENT DOCUMENTS

| | | | | |
|---|---|---|---|---|
| 2017/0149775 A1* | 5/2017 | Bachar | ............... | H04L 67/303 |
| 2017/0237301 A1* | 8/2017 | Elad | ............... | H02J 7/025 |
| | | | | 307/104 |
| 2017/0346848 A1* | 11/2017 | Smith | ............... | H04L 63/06 |
| 2018/0255446 A1* | 9/2018 | Reunamaki | ............... | H04W 76/11 |

OTHER PUBLICATIONS

Wente Zeng, et al., Resilient Distributed Control in the Presence of Misbehaving Agents in Network Control Systems, 2014 IEEE Transaction on Cybernetics, vol. 44, No. 11, 2038-3049 (Year: 2014).*

Li et al., IoT Architecture Enabling Dynamic Security Policies, Dec. 2016, ICINS'16, pp. 50-54 (Year: 2016).*

Due et al., Security Challenges in IoT Development: A Software Engineering Perspective, 2017 In Proceedings of XP'17 Workshops, Cologne, Germany, pp. 1-5 (Year: 2017).*

Asokan et al. "Seda: Scalable embedded device attestation." Proceedings of the 22nd ACM SIGSAC Conference on Computer and Communications Security. ACM, 2015. 16 pp.

Atzori et al., "The internet of things: A survey." Computer networks 54.15 (2010): 2787-28. 19 pp.

Park et al. "SMATT: Smart meter attestation using multiple target selection and copy-proof memory." Computer Science and its Applications. Springer Netherlands, 2012. 875-887. 13 pp.

Sadeghi et al., "Security and privacy challenges in industrial internet of things." Proceedings of the 52nd Annual Design Automation Conference. ACM, 2015. 6 pp.

* cited by examiner

SECURITY FOR INTERNET OF THINGS DEVICES

BACKGROUND

The present invention relates to Internet of Things (IoT) devices, and more specifically, to security issues related to IoT devices. The number of connected IoT devices is currently growing at a very high rate in the Internet of Things (IoT) domain. The increasing digitization and automation of the multitudes of IoT devices deployed across different areas of modern urban environments create new security challenges to many industries.

For example, many IoT devices are starting to show up at corporate offices for use in conference rooms, executive suites, and even as a low-cost building security camera system. Others are used for various types of home automation and/or security systems. Researchers have demonstrated that many such IoT devices can be hacked into, and that it is even possible to "eavesdrop" on PIN codes etc. that are used for new IoT device installations. In particular for home automation systems, a common hack is to break into a connected home hub, which then provides access to any of the connected IoT devices including door locks, motion detectors, sprinkler systems, and even the alarm system protecting a home. Many IoT devices also use wireless networks, such as a wireless home network, and therefore open up the possibility of a user hacking in to an IoT device to retrieve the password to the wireless network, which may lead to a number of various problems.

Further, due to the emerging market for IoT devices, many companies that manufacture IoT devices have a small staff and may not even have security professionals working for them. Often, they tend to use third-party electronics that may or may not have been certified or even tested for security. As the market is so new, the main goal for many of these companies is to get these gadgets to market quickly. Thus, it is clear that new and improved techniques for managing security of IoT devices are needed.

SUMMARY

According to one embodiment of the present invention, methods, systems and computer program products are provided for enhancing the security of Internet of Things (IoT) devices. A homogenous and leaderless group of IoT devices sharing one or more common features is defined. During operation of the IoT devices, it is identified whether an IoT device in the group operates outside an expected tolerance for the operation of the IoT devices in the group. In response to identifying that an IoT device in the group operates outside an expected tolerance, an action is performed on the IoT device.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

As was mentioned above, in the IoT domain, the security of IoT devices is a growing concern. While there are many challenges to IoT device security, there are also some characteristics that are particular to IoT devices that allow for novel approaches to be used. One such characteristic is that often there may be many IoT devices that are gathering similar types of sensor readings, or that have similar security challenges facing a common enemy in the form of malware or some security threat. This sets the stage for allowing a number of IoT devices to collaborate as a group to assess challenges, and work together to address security threats, in order to yield a more secure and accurate IoT.

Another characteristic of IoT devices is that often there may be many essentially identical IoT devices running the same level of software, with the same hardware, and yet each IoT device may be facing a common enemy in the form of malware or some security threat. Given the similarity of the IoT devices, it is possible to develop specific algorithms that can be implemented for groups of IoT devices, as opposed to for individual IoT devices only, to detect and mitigate any anomalies found in these groups of IoT devices.

By using both the collective behaviors and the individual behavior of IoT devices, it is possible to improve the security of the IoT as a whole. In the following, IoT devices that collaborate as a group for their common good to mitigate security threats will be referred to as a "swarm of IoT devices."

Further, with the growth of Software as a Service (SaaS) offerings providing IoT platform features, there are new capabilities, which can be exploited in novel ways. The IoT service can be used to facilitate a novel collective approach to security, which has not been available in the past. Some of these new security capabilities will be described in further detail below.

The various embodiments of the invention pertain to techniques for improving security for IoT devices through the usage of a collective swarm of IoT devices operating together to more efficiently address security needs and challenges. Furthermore the system is able to constantly adapt to new threats by integrating with a SaaS IoT service provider to facilitate this collective behavior amongst a group of individual IoT devices.

Furthermore, as will be described below, once a swarm is established, sub groups within the swarm may form in order to address problems beyond security, for example, a more accurate reading may be achieved through consensus of nearby IoT devices, or IoT devices may collaborate to more quickly or accurately gather readings. This idea may be extended to many different indicators.

Figure 1:
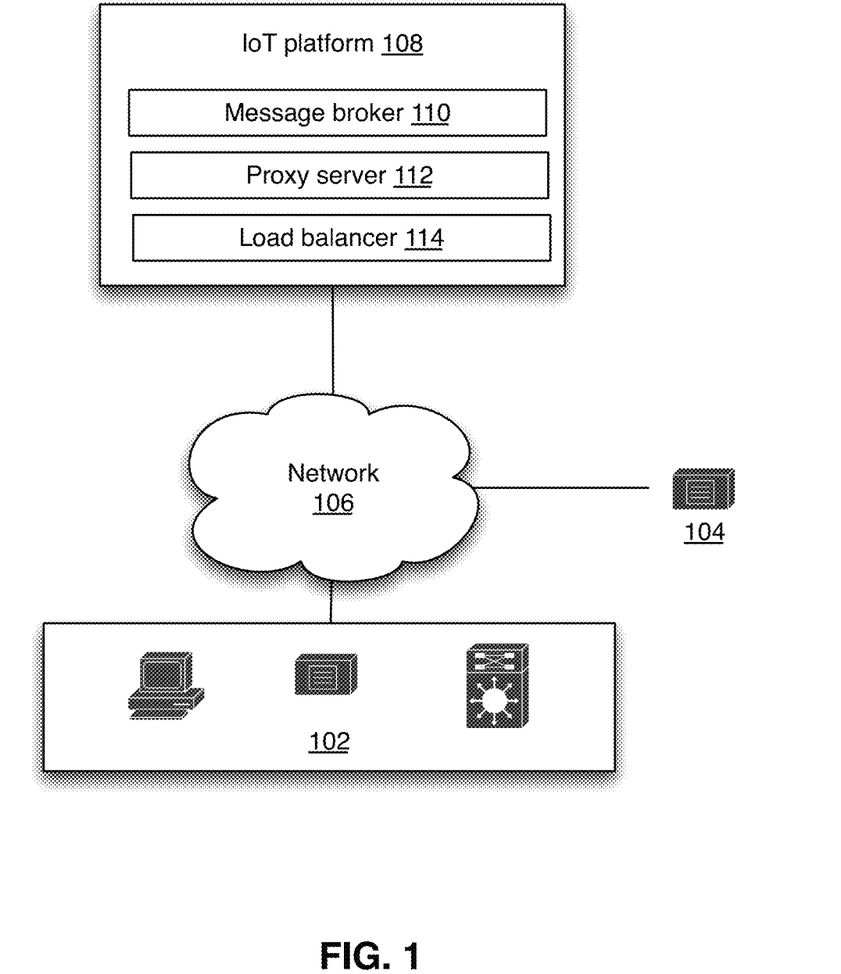
FIG. 1 is a schematic block diagram showing a swarm of IoT devices and an IoT platform, in accordance with one embodiment.
Figure 2:
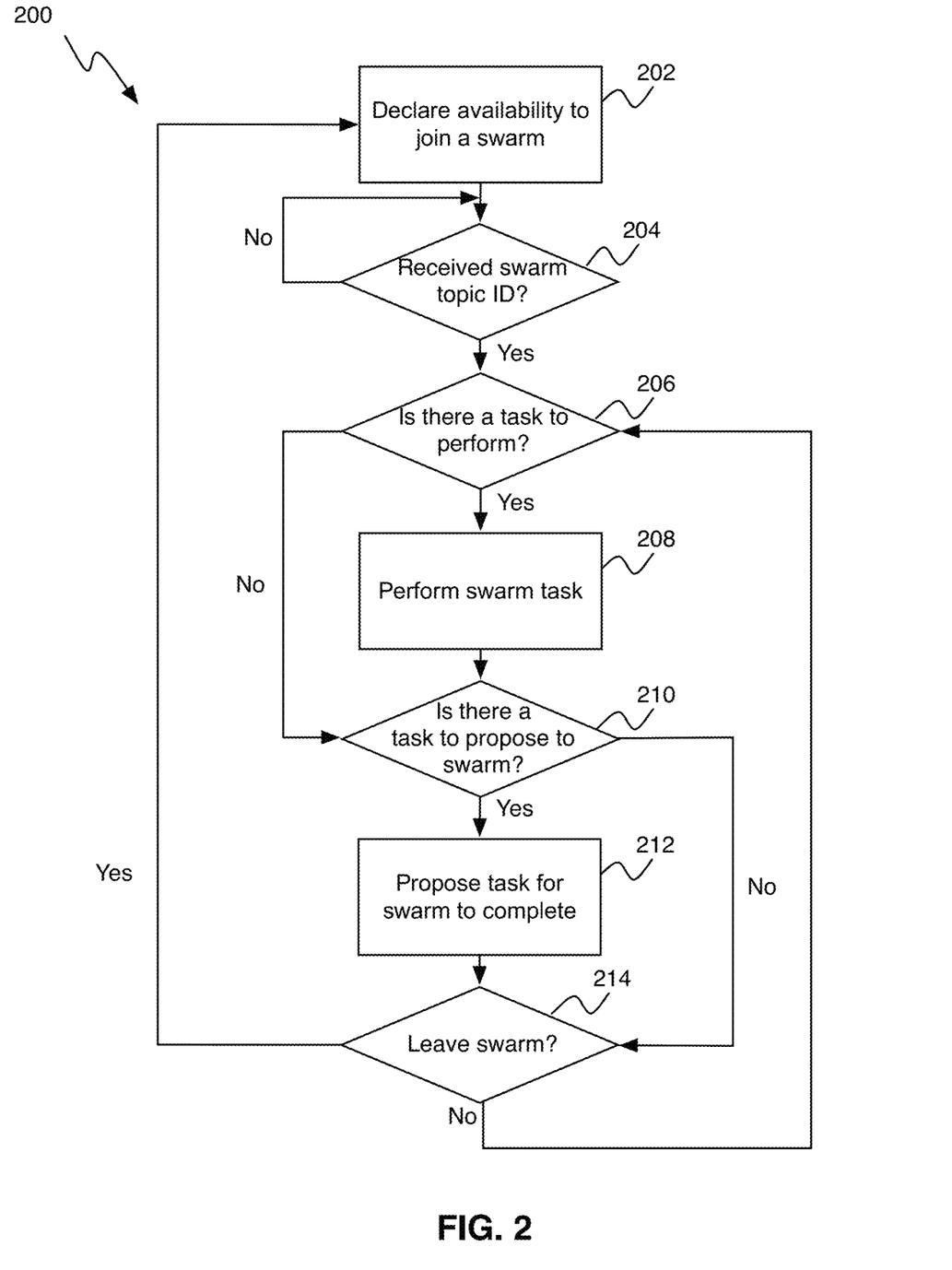
FIG. 2 shows a flowchart of a process for an IoT device joining a swarm, in accordance with one embodiment.

With reference now to FIGS. 1-2, various embodiments of the invention will be described by way of example. As described above, the various embodiments of the invention arise from the underlying idea that rather than a single IoT device operating individually, where the IoT device is responsible for security scan of its entire address space and file system, as is the typical situation in a conventional setup, swarms of IoT devices can cooperate such that each IoT device is only responsible for a portion of the security scan of its entire address space and file system. For example, in a swarm of four IoT devices, each IoT device would be responsible only for a security scan of 25% of its entire address space and the file system at any one time. In a swarm of eight IoT devices, each IoT device is only responsible for a security scan of 12.5% of its entire address space and the file system at any one time, etc. The way in which the workload is divided between the IoT devices can be determined in a number of ways, for example, randomly, using a round robin algorithm, or by any other process suitable for dividing workload, all of which are familiar to those having ordinary skill in the art.

Further, as the skilled person realizes, there may also be implementations where different IoT devices in a swarm dedicate different amounts of resources to the security scans, as long as their respective percentages add up to 100%. For example, there may be times when only certain IoT devices in the swarm actively collect and/or process data. In such a case, the remaining IoT devices in the swarm can take on a larger portion of the security scan during that time. For example, in a group of four IoT devices, one might be collecting data, two other IoT devices may do 25% of the security scan, and the last IoT device may do 50% of the security scan. Many variations of such implementations are within the scope of those having ordinary skill in the art. Once the data collection/processing is done by the first IoT device, all the IoT devices in the swarm may go back to handling the same percentage of the security scan as before, i.e., 25% each.

A process 200 for an IoT device joining a swarm, in accordance with one embodiment will now be described by way of example with reference to FIGS. 1 and 2. The swarm of IoT devices can either include multiple IoT devices of different types, or multiple IoT devices of the same type.

FIG. 1 shows a group of IoT devices 102 operating as a swarm, and an IoT device 104 that intends to join the swarm 102. The IoT devices 102 and 104 communicate over a network 106, such as the Internet, with each other and with an IoT platform 108. The IoT platform 108 includes a messaging broker 110, whose function will be described in further detail below, and can optionally also include one or more proxy servers 112 and one or more load balancers 114, whose functions are well known to those having ordinary skill in the art. The interaction between these components will now be described with reference to FIG. 2.

As can be seen in FIG. 2, the process 200 begins by the IoT device 104 declaring its availability to join a swarm 102 in step 202. In one embodiment, the IoT devices communicate using a Message Queuing Telemetry Transport (MQTT) protocol, which is an ISO standard (ISO/IEC PRF 20922) publish-subscribe-based "lightweight" messaging protocol for use on top of the TCP/IP protocol, and is familiar to those having ordinary skill in the art. The MQTT protocol is specifically designed for connections with remote locations where a "small code footprint" is required or the network bandwidth is limited. The publish-subscribe messaging pattern uses a message broker 110 to distribute messages to interested clients based on the topic of a message. Typically, there are multiple MQTT topics available, which are associated with different swarms 102, and an IoT device 104 can announce itself by publishing its availability on a particular MQTT topic.

The IoT device 104 then waits until it has received a swarm topic ID in step 204. The swarm topic ID can be characterized as a "secret topic" that indicates that the IoT device 104 has been formally included in a swarm 102. The decoupled nature of the MQTT protocol's publish/subscribe messaging pattern gives the swarm 102 the ability to function independently of how many IoT devices join the swarm and their independent states (e.g., a IoT device may be broken, hung, etc.) so that the swarm 102 continuously operates even if some IoT devices are broken.

In step 206, the IoT device 104 checks if there is a swarm task to perform. The swarm task is typically provided to the swarm by the messaging broker 110 in the IoT platform 108, based on the topic to which the swarm 102 is subscribed. If there is no current swarm task to perform in step 206, the process goes to step 210, which will be described below. If there is a swarm task, then the IoT device 104 takes part in performing the task in step 208. Once the task is complete, the IoT device 104 checks whether there is another task to propose to the swarm in step 210.

The tasks to propose to the swarm can take a variety of forms. For example, if an IoT device detects that one of its files has been compromised/corrupted, the IoT device 104 can propose to the swarm 102 that other IoT devices verify themselves in that specific location against a trusted signature. By doing so, the other IoT devices can become aware of security exposures more rapidly than they would be able to do on their own. The initial identification of a problem is consistent with current processes for an individual computing process. However, due to the sharing of the information between the IoT devices in the swarm, the identification of a problem can occur much faster compared to a conventional setup in which each IoT device must wait for its own scan cycle.

Another example of a task is if a IoT device detects attack behavior from a certain IP location, then the IoT device can "discuss" the issue with the swarm and "self-harden" the entire swarm more rapidly than each IoT device would be able to do on its own. Again, once a IoT device in a swarm has identified a risk, the sharing of this information with the other members in the swarm makes it possible to expedite the actions that need to be taken to protect the other IoT devices in the swarm.

Some other situations when a IoT device may propose a task are when the bandwidth that a IoT device is consuming is higher or lower than expected, when there has been a certain number of failed login attempts, when the number and identities of users accessing the IoT device appear abnormal, when virus scan results return unexpected results. Another indicator may be when a minority of the sensors report sensor data that is more than a certain number standard deviations from the average, or when a dynamic minority of the sensors report sensor data that is more than a certain number standard deviations from the average. A dynamic minority of sensors, as used herein, is a variable number of sensors from the set of sensors, in which the number is less than half of the size of the set of sensors. The minority size may vary from event to event. As the skilled person realizes, many different types of situations may exist that fall within the scope of the appended claims.

If it is determined in step 110 that there is a task to propose, the IoT device proposes a task for the swarm to complete in step 112, and then checks whether the IoT device should leave the swarm in step 114. If it is determined in step 110 that there is no task to propose, the process skips step 112 and continues straight to step 114. If it is determined in step 114 that the IoT device should stay in the swarm, the process continues to step 106, where it again checks whether there is a swarm task to perform. If it is determined in step 114 that the IoT device should leave the swarm, the IoT device leaves the swarm and again declares its availability to join a swarm, in step 102, as described above.

In another embodiment, an indicator may be when a swarm operates as a collaboration of IoT devices for more accurate readings, for example, a fitness tracker, a phone, a treadmill, and sneakers operating together, to get accurate step count. A swarm may use historical data based on current situation, to bridge a sensing gap from one or several sensors instead of reporting gaps in sensor readings as observed/reported by each individual sensor/device.

When operating in a swarm, the publish-subscribe messaging pattern is used to decouple the IoT devices in the swarm so that no IoT device needs to be explicitly aware of any other IoT device operating in the swarm. While IoT devices in the swarm receive communications from their peer IoT devices in the swarm that a task was being accepted, each individual IoT device would not need to know what specific IoT device is accepting the task, but only that the task is accepted by some IoT device in the swarm. This allows the swarm to operate as a "leaderless" entity, in which no particular member of the swarm has any specific powers above the others. That is, if any IoT device is broken, the swarm continues to operate. In contrast, in a leader configuration, if the leader goes down, the whole swarm goes down too (at least for some amount of time). Further, when there is no leader in a swarm, each IoT device is on an equal footing and has equal weight within the swarm, which results in a more robust, collective type of operation by the swarm.

Figure 3:
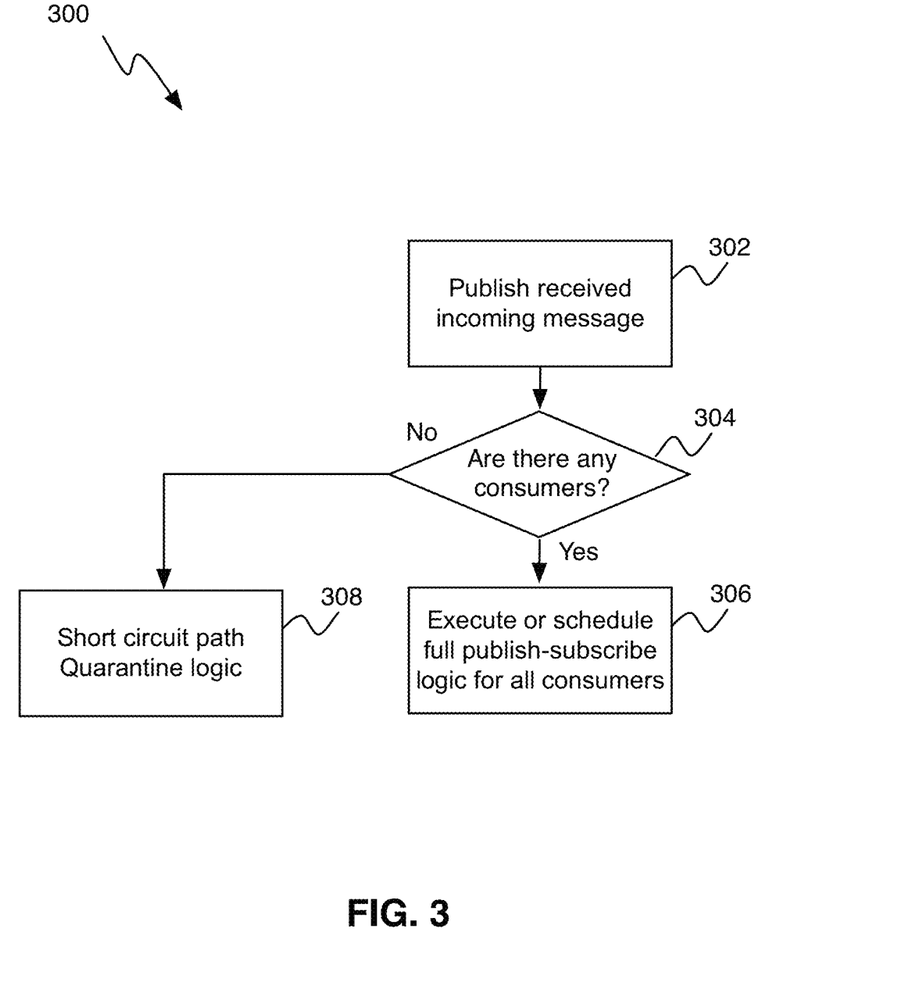
FIG. 3 shows a process for performing an enforced action by a message broker, in accordance with one embodiment.

An IoT device in a swarm, which continues to do what it wants to do and fails to comply with the request to leave the swarm is considered to have "gone rogue," and may be subject to "quarantine" or some other enforced action by the swarm, or the IoT platform. This allows the swarm to treat such a rouge IoT device as if the IoT device was never registered with the swarm. For example, a well-behaving IoT device may publish one message per minute, while a problem IoT device may publish thousands of messages per minute, which could overload the capacity of the swarm to conduct its business. FIG. 3 shows a process 300 for how this is done by the messaging broker of the IoT platform in accordance with one embodiment.

In one embodiment, the logic for quarantining IoT devices is implemented in the proxy server 112, where a short circuit path is used to identify swarm members who have been quarantined because there are no longer any subscribers to its data. In other embodiments, the logic for quarantining IoT devices can be implemented in the message broker 110. In general, it is preferable to implement the logic close to the edge of the IoT platform 108 as possible, in order to reduce the back-end load on the performance critical servers in the IoT platform 108. In some embodiments, the quarantining logic is handled by changing authentication methods between the IoT devices.

As can be seen in FIG. 3, a received incoming message is published in step 302. Examples of incoming messages include messages requesting to join the swarm, requesting to leave the swarm, tasks for the swarm to accomplish, results of tasks, propose a IoT device to be quarantined from the swarm, votes/elections from the swarm as to whether to quarantine a IoT device that has been proposed to be quarantined, etc.

Next, the process checks whether there are any consumers of the message (i.e., members of the swarm) in step 304. If there are consumers, then the full publish-subscribe logic is executed for all consumers, as detailed in and described with respect to FIGS. 1 and 2 above, step 306. If there are no consumers in step 304 (i.e., no other IoT devices are listening to the IoT device that is publishing the message), then a short circuit path to quarantine logic is taken, step 308, and the IoT device is disconnected from the swarm service. The IoT device can later reconnect and attempt to join the swarm again, as described above.

It should be noted that quarantining the IoT device is only one action among many actions that that may be taken. For example, in other embodiments, alternative actions could be rebooting the IoT device, updating firmware or resetting the IoT device before the IoT device would be allowed to be a functioning part of the swarm. The action to take can be determined, for example, using cognitive analysis.

One example of cognitive analysis is that the swarm itself can begin making decisions about the swarm rules. For example, the swarm can "discuss" among all its member IoT devices whether a certain swarm member's readings are way out of range, or that the swarm member is somehow not "acting appropriately" in some way, perhaps even attacking the swarm itself, or becoming "too talkative" on the swarm (e.g., flooding with messages or requests at an unusual rate or a rate not agreed upon by the swarm). The swarm can then propose that an IoT device be quarantined, and perhaps hold a vote to that effect. If the swarm collectively votes to remove a certain IoT device, then the swarm has made a decision on its own.

The "discussion" to come to a decision whether to remove an IoT device from the swarm or not (i.e. quarantine and send a "leave swarm" command) can be implemented in a variety of ways. For example, in some embodiments each IoT device in the swarm can be challenged to respond in some manner, and incorrect responses will result in removal (similar to "What's the secret code to get in?"). In some embodiments, a "roll call" can be requested. That is, each IoT device can "sound-off" to declare/affirm its presence. If an IoT device sends a suspect answer (e.g., a response that does not look like past responses, is out of order with/from others, etc.), then the IoT device will be removed. In some embodiments, longer-term anomalous behavior is considered. If the IoT Platform notices, over an extended period of observation time, that an IoT device's responses/events/activity is out of the ordinary, as compared to how the IoT device acted in the past, then the IoT device could be viewed as suspect and removed from the swarm. As the skilled person realizes, these are just a few techniques, and many variations can be contemplated that fall within the scope of the claims.

Figure 4:
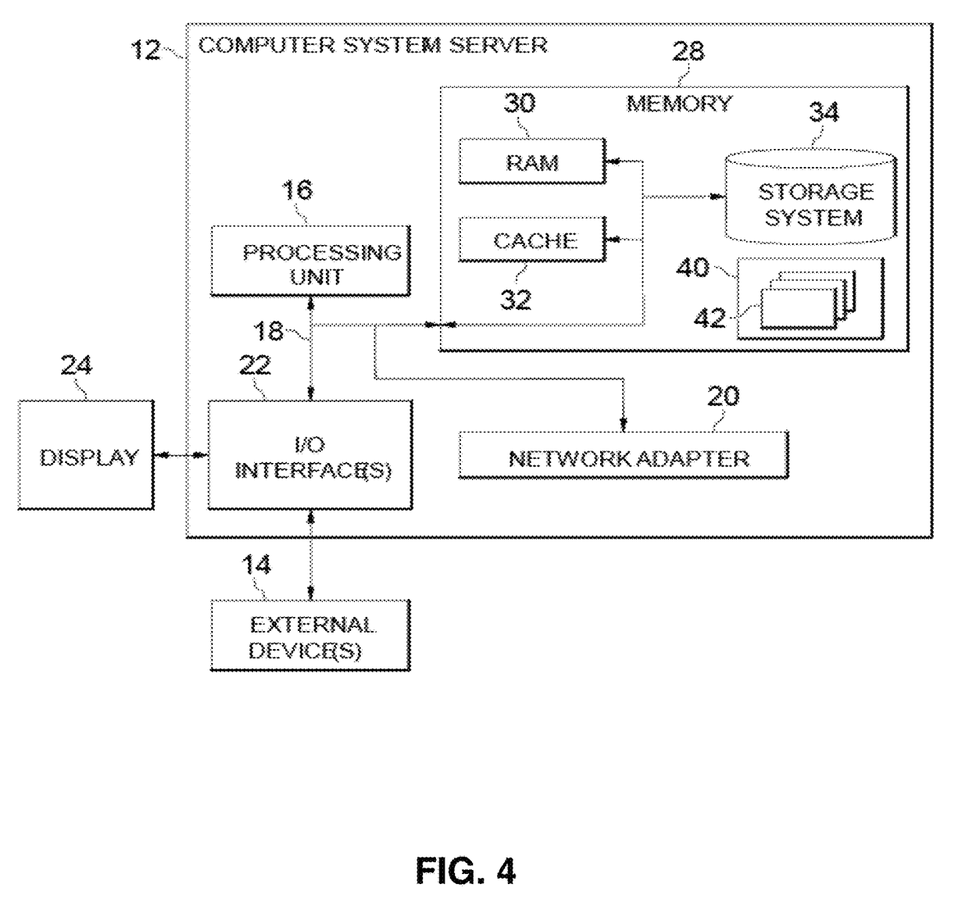
FIG. 4 shows a computer system in which various embodiments of the invention can be implemented.

FIG. 4 shows a schematic view of a computer system in which various embodiments of the present invention can be implemented. As shown in FIG. 2, the computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external IoT devices 14 such as a keyboard, a pointing IoT device, a display 24, etc.; one or more IoT devices that enable a user to interact with computer system 12; and/or any IoT devices (e.g., network card, modem, etc.) that enable computer system/server 12 to communicate with one or more other computing IoT devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, and redundant processing units The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhancing the security of Internet of Things (IoT) devices, comprising:
   defining a homogenous and leaderless group of IoT devices sharing one or more common features, wherein each IoT device is only responsible for a portion of a security scan of its address space and file system and wherein the security of the group of IoT devices as a whole is shared between the individual IoT devices in the group of IoT devices;
   during operation of the IoT devices, identifying whether an IoT device in the group operates outside an expected tolerance for the operation of the IoT devices in the group, wherein the identifying is done by the IoT device itself;
   reporting, by the IoT device, any operation outside the expected tolerance to the other IoT devices in the group of IoT devices;
   in response to the other IoT devices in the group of IoT devices receiving the report, determining collectively by the IoT devices in the group a corrective action to perform on the IoT device, wherein the determination is done by performing one of:
   asking the IoT device to declare its presence and noting its response;
   challenging the IoT device and noting its response; and
   analyzing the longer-term behavior of the IoT device and detecting an abnormal longer-term behavior of the IoT device; and
   performing by the other IoT devices in the group of IoT devices the corrective action on the IoT device, wherein the corrective action on the IoT device includes one or more of: removing the IoT device from the group of IoT devices, rebooting the IoT device, and resetting the IoT device.

2. The method of claim 1, wherein the IoT devices communicate using a message queuing telemetry transport (MQTT) protocol.

3. The method of claim 2, further comprising:
   requesting by an IoT device to join the group, wherein the request is made by publishing the availability of the IoT device on a first MQTT topic associated with the group; and
   receiving a second topic in response to the request, the second topic confirming inclusion of the IoT device in the group.

4. A computer program product for enhancing the security of Internet of Things (IoT) devices, the computer program product comprising a computer readable storage medium having program instructions embodied therewith, wherein the computer readable storage medium is not a transitory signal per se, the program instructions being executable by a processor to cause the processor to perform a method comprising:
   defining a homogenous and leaderless group of IoT devices sharing one or more common features, wherein each IoT device is only responsible for a portion of a security scan of its address space and file system and wherein the security of the group of IoT devices as a whole is shared between the individual IoT devices in the group of IoT devices;
   during operation of the IoT devices, identifying whether an IoT device in the group operates outside an expected tolerance for the operation of the IoT devices in the group, wherein the identifying is done by the IoT device itself;
   reporting, by the IoT device, any operation outside the expected tolerance to all the other IoT devices in the group of IoT devices;
   in response to the other IoT devices in the group of IoT devices receiving the report, determining collectively by the IoT devices in the group a corrective action to perform on the IoT device, wherein the determination is done by performing one of:
   asking the IoT device to declare its presence and noting its response;
   challenging the IoT device and noting its response; and analyzing the longer-term behavior of the IoT device and detecting an abnormal longer-term behavior of the IoT device; and performing by the other IoT devices in the group of IoT devices the corrective action on the IoT device, wherein the corrective action on the IoT device includes one or more of: removing the IoT device from the group of IoT devices, rebooting the IoT device, and resetting the IoT device.

5. The computer program product of claim 4, wherein the IoT devices communicate using a message queuing telemetry transport (MQTT) protocol.

6. The computer program product of claim 5, wherein the method further comprises:

requesting by an IoT device to join the group, wherein the request is made by publishing the availability of the IoT device on a first MQTT topic associated with the group; and receiving a second topic in response to the request, the second topic confirming inclusion of the IoT device in the group.

7. A system for enhancing the security of Internet of Things (IoT)devices, comprising:

a processor; and a memory containing instructions that when executed by the processor causes the following steps to be performed:

defining a homogenous and leaderless group of IoT devices sharing one or more common features, wherein each IoT device is only responsible for a portion of a security scan of its address space and file system and wherein the security of the group of IoT devices as a whole is shared between the individual IoT devices in the group of IoT devices;

during operation of the IoT devices, identifying whether an IoT device in the group operates outside an expected tolerance for the operation of the IoT devices in the group, wherein the identifying is done by the IoT device itself;

reporting, by the IoT device, any operation outside the expected tolerance to all the other IoT devices in the group of IoT devices;

in response to the other IoT devices in the group of IoT devices receiving the report, determining collectively by the IoT devices in the group a corrective action to perform on the IoT device, wherein the determination is done by performing one of:

asking the IoT device to declare its presence and noting its response;

challenging the IoT device and noting its response; and analyzing the longer-term behavior of the IoT device and detecting an abnormal longer-term behavior of the IoT device; and performing by the other IoT devices in the group of IoT devices the corrective action on the IoT device, wherein the corrective action on the IoT device includes one or more of: removing the IoT device from the group of IoT devices, rebooting the IoT device, and resetting the IoT device.

\* \* \* \* \*